US009559959B2

(12) United States Patent
Ehara

(10) Patent No.: US 9,559,959 B2
(45) Date of Patent: Jan. 31, 2017

(54) CONTROL APPARATUS, COMMUNICATION SYSTEM, SWITCH CONTROLLING METHOD AND PROGRAM

(71) Applicant: Koji Ehara, Tokyo (JP)

(72) Inventor: Koji Ehara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/384,050

(22) PCT Filed: Mar. 8, 2013

(86) PCT No.: PCT/JP2013/056404
§ 371 (c)(1),
(2) Date: Sep. 9, 2014

(87) PCT Pub. No.: WO2013/133400
PCT Pub. Date: Sep. 12, 2013

(65) Prior Publication Data

US 2015/0036498 A1 Feb. 5, 2015

(30) Foreign Application Priority Data

Mar. 9, 2012 (JP) ................................ 2012-053265

(51) Int. Cl.
*H04L 12/28* (2006.01)
*H04L 12/801* (2013.01)
(Continued)

(52) U.S. Cl.
CPC ............... *H04L 47/12* (2013.01); *H04L 45/54* (2013.01); *H04L 47/28* (2013.01); *H04L 43/026* (2013.01); *H04L 43/0876* (2013.01)

(58) Field of Classification Search
None
See application file for complete search history.

(56) References Cited

U.S. PATENT DOCUMENTS 5,060,228 A 10/1991 Tsutsui et al.
7,002,955 B1 2/2006 Kanuri et al.
(Continued)

FOREIGN PATENT DOCUMENTS

CN 1713617 A 12/2005
CN 1953392 A 4/2007
(Continued)

OTHER PUBLICATIONS

Japanese Office Action dated Aug. 18, 2015 with an English translation thereof.
(Continued)

*Primary Examiner* — Anh-Vu Ly
(74) *Attorney, Agent, or Firm* — McGinn IP Law Group, PLLC.

(57) ABSTRACT

A control apparatus includes a communication device controller that acts on a set of flow entries retained by one communication device of a group of communication devices(s) to control the group of the communication devices(s), and a flow statistics information management unit that gathers and manages the flow statistics information collected by the communication device per flow entry. On occurrence of a new flow, the communication device controller finds an estimated lifetime of the new flow based on the flow statistics information, and sets a flow entry on the communication device(s) on a path of the new flow. The flow entry has set an aging time consistent with the estimated lifetime.

17 Claims, 13 Drawing Sheets

(51) Int. Cl.

| | |
|---|---|
| ***H04L 12/841*** | (2013.01) |
| ***H04L 12/741*** | (2013.01) |
| *H04L 12/26* | (2006.01) |

(56) References Cited

U.S. PATENT DOCUMENTS

| | | | | |
|---|---|---|---|---|
| 7,644,157 | B2 | 1/2010 | Shomura et al. | |
| 7,729,271 | B2 | 6/2010 | Tsuchiya et al. | |
| 7,787,442 | B2 | 8/2010 | Akahane et al. | |
| 8,605,734 | B2 | 12/2013 | Ichino | |
| 2003/0012197 | A1* | 1/2003 | Yazaki | H04L 47/10 370/392 |
| 2003/0043802 | A1* | 3/2003 | Yazaki | H04L 29/06 370/389 |
| 2005/0013300 | A1* | 1/2005 | Akahane | H04L 12/2602 370/395.3 |
| 2005/0276230 | A1* | 12/2005 | Akahane | H04L 12/2602 370/252 |
| 2007/0115850 | A1* | 5/2007 | Tsuchiya | H04L 43/022 370/252 |
| 2007/0177600 | A1* | 8/2007 | Suzuki | H04L 12/2602 370/392 |
| 2007/0271374 | A1 | 11/2007 | Shomura et al. | |
| 2010/0027436 | A1* | 2/2010 | Yamasaki | H04L 12/2602 370/252 |
| 2011/0261723 | A1* | 10/2011 | Yamato | H04L 45/34 370/255 |
| 2011/0261825 | A1 | 10/2011 | Ichino | |

FOREIGN PATENT DOCUMENTS

| | | | |
|---|---|---|---|
| CN | 101075911 | A | 11/2007 |
| CN | 102349268 | A | 2/2012 |
| JP | 3-1735 | A | 1/1991 |
| JP | 11-68818 | A | 3/1999 |
| JP | 2003-526279 | A | 9/2003 |
| JP | 2005-33351 | A | 2/2005 |
| JP | 2005-109592 | A | 4/2005 |
| JP | 2005-236378 | A | 9/2005 |
| JP | 3788992 | B2 | 6/2006 |
| JP | 2006-279531 | A | 10/2006 |
| JP | 2009-153079 | A | 7/2009 |
| JP | 2010-161473 | A | 7/2010 |
| JP | 2011-101245 | A | 5/2011 |

OTHER PUBLICATIONS

Extended European Search Report dated Oct. 14, 2015.

Martin Zadnik, et al.: “Evaluation and Design of Cache Replacement Policies Under Flooding Attacks”, Wireless Communications and Mobile Computing Conference (IWCME), 2011 7*th* International, IEEE, Jul. 4, 2011, pp. 1292-1297.

Andrew R Curtis, et al.: “DevoFlow”, Sigcomm, ACM, 2 Penn Plaza, Suite 701 New York, NY 10121-0701 USA, Aug. 15, 2011, pp. 254-265.

International Search Report (ISR) (PCT Form PCT/ISA/210), in PCT/JP2013/056404, dated Jun. 4, 2013.

Nick McKeown and seven others, “OpenFlow: Enabling Innovation in Campus Networks”, [online], [searched on Feb. 14, Heisei 24 (2012)], Internet <URL: http://www.openflow.org/documents/openflow-wp-latest.pdf>.

“OpenFlow Switch Specification” Version 1.1.0 Implemented (Wire Protocol 0x02), [online], [searched on Feb. 14, Heisei 24 (2012)], Internet <URL: http://www.openflow.org/documents/openflow-spec-v1.1.0.pdf>.

Chinese Office Action dated Aug. 1, 2016 and English Translation thereof.

Guoxing Feng, “Study and Realization of Network . . . ”, Chinese Outstanding Master’s Dissertations Full-Text Database, Information Technology Series (2011), No. 12, with English Translation Abstract.

* cited by examiner

CONTROL APPARATUS
10
11
12
FLOW STATISTICS INFORMATION MANAGEMENT UNIT
COMMUNICATION DEVICE CONTROLLER
FLOW A: ESTIMATED LIFETIME = XXms
FLOW A: FORWARDED TO 20B AGING TIME: YYms
FLOW A: FORWARDED TO 20D AGING TIME: YYms
FLOW A: FORWARD TO HOST AGING TIME: YYms
20A
20B
20C
20D
COMMUNICATION DEVICE
COMMUNICATION DEVICE
COMMUNICATION DEVICE
COMMUNICATION DEVICE

FIG. 4

| SWITCH NAME | PORT NAME | SWITCH NAME | PORT NAME | BANDWIDTH |
|---|---|---|---|---|
| SWITCH 201 | P12 | SWITCH 202 | P21 | 1Gbps |
| SWITCH 201 | P13 | SWITCH 203 | P31 | 1Gbps |
| SWITCH 202 | P24 | SWITCH 204 | P42 | 1Gbps |
| SWITCH 203 | P34 | SWITCH 204 | P43 | 1Gbps |
| SWITCH 203 | P35 | SWITCH 205 | P53 | 1Gbps |
| SWITCH 204 | P46 | SWITCH 206 | P64 | 1Gbps |
| SWITCH 205 | P56 | SWITCH 206 | P65 | 1Gbps |

FIG. 5

| SWITCH NAME | NUMBER OF REGISTERED FLOW TABLES | UPPER LIMIT NUMBER OF REGISTERED FLOW TABLES | FLOW TABLE USE RATIO |
|---|---|---|---|
| SWITCH 201 | 500000 | 1000000 | 50% |
| SWITCH 203 | 800000 | 1000000 | 80% |
| SWITCH 205 | 500000 | 1000000 | 50% |
| SWITCH 206 | 200000 | 1000000 | 20% |

FIG. 6

| SWITCH NAME | TRANSMISSION SOURCE IP ADDRESS | DESTINATION IP ADDRESS | PROTOCOL | TRANSMISSION SOURCE TCP/UDP PORT NUMBER | DESTINATION TCP/UDP PORT NUMBER | TRANSMIT PORT |
|---|---|---|---|---|---|---|
| SWITCH 201 | 192.168.0.1 | 192.168.10.1 | UDP | * | 161 | P13 |
| SWITCH 203 | 192.168.0.1 | 192.168.10.1 | UDP | * | 161 | P35 |
| SWITCH 205 | 192.168.0.1 | 192.168.10.1 | UDP | * | 161 | P56 |
| SWITCH 206 | 192.168.0.1 | 192.168.10.1 | UDP | * | 161 | P60 |

FIG. 7

| TRANSMISSION SOURCE IP ADDRESS | DESTINATION IP ADDRESS | PROTOCOL | TRANSMISSION SOURCE TCP/UDP PORT NUMBER | DESTINATION TCP/UDP PORT NUMBER | AVERAGE FLOW TABLE REGISTRATION TIME INTERVAL | AVERAGE AGING TIME VALUE | AVERAGE COUNT NUMBER |
|---|---|---|---|---|---|---|---|
| 192.168.0.1 | 192.168.10.1 | UDP | * | 161 | 600 | 300 | 10 |

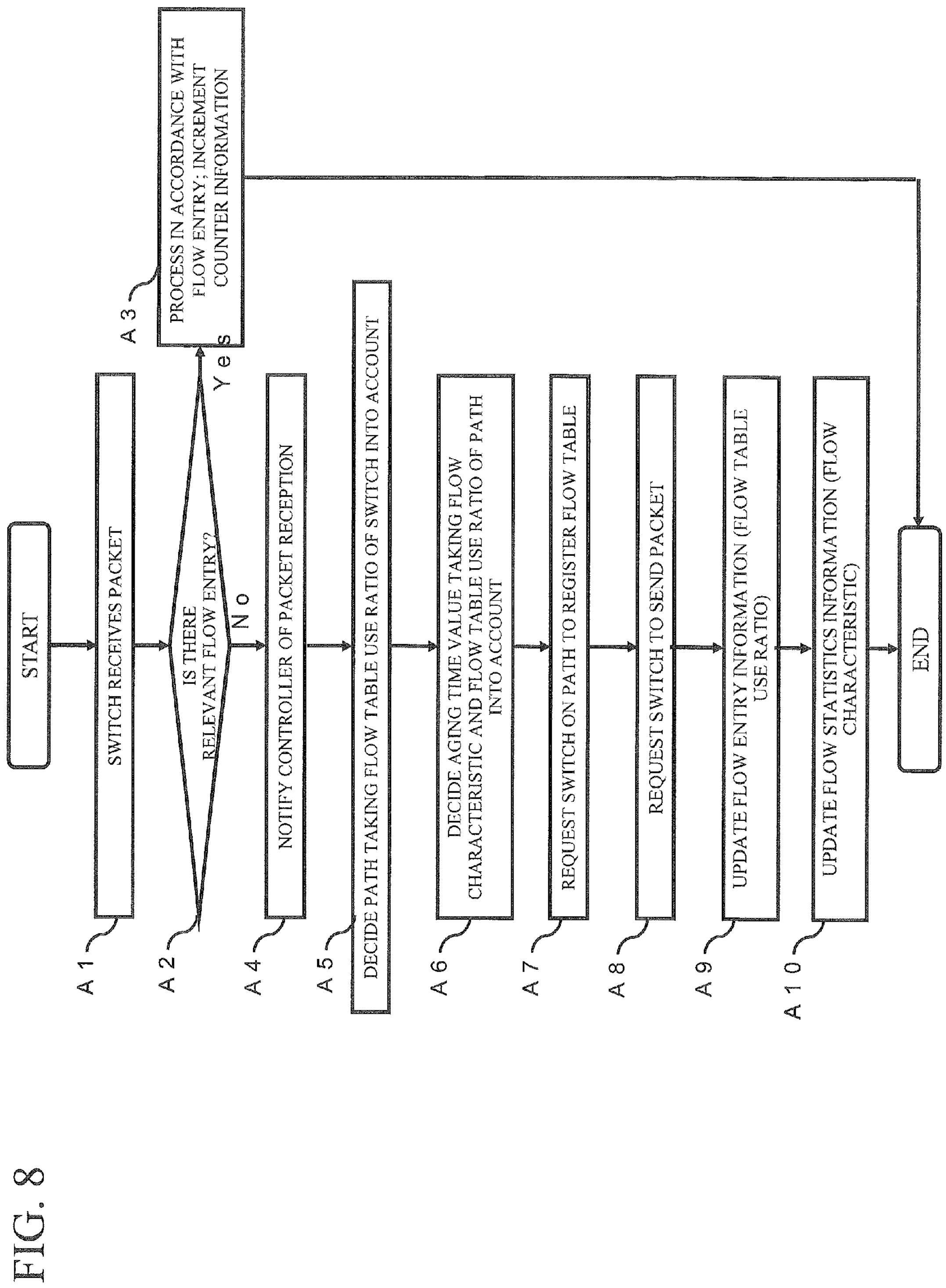
FIG. 8
START
A1
SWITCH RECEIVES PACKET
A2
IS THERE RELEVANT FLOW ENTRY?
No
Yes
A3
PROCESS IN ACCORDANCE WITH FLOW ENTRY; INCREMENT COUNTER INFORMATION
A4
NOTIFY CONTROLLER OF PACKET RECEPTION
A5
DECIDE PATH TAKING FLOW TABLE USE RATIO OF SWITCH INTO ACCOUNT
A6
DECIDE AGING TIME VALUE TAKING FLOW CHARACTERISTIC AND FLOW TABLE USE RATIO OF PATH INTO ACCOUNT
A7
REQUEST SWITCH ON PATH TO REGISTER FLOW TABLE
A8
REQUEST SWITCH TO SEND PACKET
A9
UPDATE FLOW ENTRY INFORMATION (FLOW TABLE USE RATIO)
A10
UPDATE FLOW STATISTICS INFORMATION (FLOW CHARACTERISTIC)
END 100A
CONTROL APPARATUS
101
TOPOLOGY MEMORY
102
TOPOLOGY MANAGEMENT UNIT
103
FLOW ENTRY MEMORY
104
FLOW ENTRY MANAGEMENT UNIT
115
FLOW CHARACTERISTIC SETTING MEMORY
116
FLOW CHARACTERISTIC SETTING MANAGEMENT UNIT
107
SWITCH CONTROL UNIT
200
NETWORK
201
SWITCH
202
SWITCH
203
SWITCH
204
SWITCH
205
SWITCH
206
SWITCH
P12
P21
P13
P31
P24
P42
P34
P43
P35
P53
P46
P64
P56
P65

FIG. 11

| TRANSMISSION SOURCE IP ADDRESS | DESTINATION IP ADDRESS | PROTOCOL | TRANSMISSION SOURCE TCP/UDP PORT NUMBER | DESTINATION TCP/UDP PORT NUMBER | FLOW OCCURRENCE TIME INTERVAL | REFERENCE AGING TIME VALUE |
|---|---|---|---|---|---|---|
| 192.168.0.1 | 192.168.10.1 | UDP | * | 161 | 600 | 300 |

CONTROL APPARATUS, COMMUNICATION SYSTEM, SWITCH CONTROLLING METHOD AND PROGRAM

CROSS-REFERENCE TO RELATED APPLICATION

The present application asserts priority rights based on JP Patent Application No. 2012-053265 filed on Mar. 9, 2012, the contents thereof being incorporated by reference into the present Application. This invention relates to a control apparatus, a communication system, a switch controlling method and a program and, more particularly, to a control apparatus, a communication system, a switch controlling method and a program for managing centralized control of a communication device(s) on a network.

BACKGROUND

Technical Field

Recently, it has become possible to collect the statistics information on the traffic volume on the flow basis or to effect load distribution by managing path control on the flow basis. This may be implemented by the controller performing centralized management of the flow tables of the switches on the network. An example of such technique is the OpenFlow shown in Non-Patent Document 1.

Patent Document 1 discloses a method of improving the efficiency in the communication of applications pre-defined by HTTP (Hyper-Text Transfer Protocol), FTP (File Transfer Protocol) or others, by removing an address table at an aging time interval proper to each application.

Patent Document 2 discloses a method that dynamically changes timeout time of a session, depending on the session rate, so as to enable protocol processing to be performed without causing overflow of a session memory at the time of high-load accessing.

Patent Document 3 discloses a method that takes account of the number of empty flow entries in a plurality of switches arranged on a communication network to decide a flow path so as to suppress the occurrence of entry overflow.

Patent Document 1: JP Patent Kohyo Publication No. 2003-526279A

Patent Document 2: JP Patent Kokai Publication No. 2006-279531A

Patent Document 3: JP Patent Kokai Publication No. 2010-161473A

Non-Patent Document 1: Nick McKeown and three others, "OpenFlow: Enabling Innovation in Campus Networks", [online], [searched on February 14, Heisei 24 (2012)].

Non-Patent Document 2: "OpenFlow Switch Specification" Version 1.1.0 Implemented (Wire Protocol 0x02), [online], [searched on February 14, Heisei 24 (2012)].

SUMMARY

The following analysis is given by the present invention. A communication device, represented by an OpenFlow switch, disclosed in Non-Patent Documents 1, 2, is able to forward a flow at a high speed as the flow is identified by exploiting an ASIC (Application Specific Integrated Circuit) flow table. However, there persists a problem that the number of flow entries, registrable in the ASIC flow table, is small and, if an upper limit of the number is exceeded, processing by software has to be performed, so that the transfer performance is considerably lowered. There are also cases wherein, depending on setting of the flow occurrence time interval or the aging time values, flow table removal and registration for the same flows occur repeatedly, thus increasing the overhead. Hence, it becomes necessary to reduce the number of times of flow entry registration and removal as the flow table overflow is suppressed.

In the method of Patent Document 1, an address table is removed at an aging time interval proper to a known application, however, a problem persists that the method is not effective against unknown applications.

In the method of Patent Document 2, the session information can not be selectively removed depending on the session characteristic. Hence, the method suffers a problem that, if a high-load access state is continued, the session information which, if retained, would yield better results in point of the efficiency, is removed, resulting in a state of a still higher load due to repetition of registration and removal of the session information and consequent increase in the overhead.

Furthermore, in the method of Patent Document 3, flow entry erasure is carried out at a preset timeout interval, so that, in a switch where the flow is concentrated, such as a core switch having only a smaller number of substitution paths, flow entry overflow tends to be produced.

It is an object of the present invention to provide a control apparatus, a communication system, a switch control method and a program capable of contributing to reducing the occurrence of the above mentioned flow table overflow phenomenon.

According to a first aspect, there is provided a control apparatus comprising a communication device controller that acts on a set of flow entries retained by one communication device of a group of communication device(s) to control the group of the communication device(s), and a flow statistics information management unit that gathers and manages the flow statistics information collected by the communication device per flow entry. If a new flow is encountered, the communication device controller finds an estimated lifetime of the new flow based on the flow statistics information, and sets a flow entry, having set an aging time consistent with the estimated lifetime, on the communication device(s) on a path of the new flow.

According to a second aspect, there is provided a communication system including a control apparatus and a communication device(s), in which the control apparatus comprises a communication device controller that acts on a set of flow entries retained by one communication device of a group of communication device(s) to control the group of the communication device(s) and a flow statistics information management unit that gathers and manages the flow statistics information collected by the communication device per flow entry. On occurrence of a new flow, the communication device controller finds an estimated lifetime of the new flow based on the flow statistics information, and sets a flow entry, having set an aging time consistent with the estimated lifetime, on the communication device(s) on a path of the new flow. The communication device(s) processes a packet using the flow entry as set from the control apparatus According to a third aspect, there is provided a method for controlling a communication device, in which the method comprises the steps of a control apparatus including a communication device controller that acts on a set of flow entries retained by one communication device of a group of communication device(s) to control the group of the communication device(s) and a flow statistics information management unit that gathers and manages the flow statistics information collected by the communication device(s) per flow entry, finding, on occurrence of a new flow, an estimated lifetime of the new flow based on the flow statistics information, and setting a flow entry, having set an aging time consistent with the estimated lifetime, on the communication device(s) on a path of the new flow. The present method is tied to a particular machine which is a control apparatus controlling the communication device(s) on the network.

According to a forth aspect, there is provided a non-transient computer-readable storage medium that records a program for causing a control apparatus including a communication device controller that acts on a set of flow entries retained by one communication device of a group of communication device(s) to control the group of the communication device(s) and a flow statistics information management unit that gathers and manages the flow statistics information collected by the communication device per flow entry, to perform the processing of finding, on occurrence of a new flow, an estimated lifetime of the new flow based on the flow statistics information, and the processing of setting a flow entry, having set an aging time consistent with the estimated lifetime, on the communication device(s) on a path of the new flow. It is noted that the program can be recorded on a computer readable recording medium. That is, the present invention can be implemented as a computer program product.

The meritorious effects of the present disclosure are summarized as follows.

According to the present disclosure, it is possible to contribute to reducing the flow table overflow phenomenon in a communication device that identifies a flow by an entry registered in a flow table.

BRIEF DESCRIPTION OF THE DRAWINGS

FIG. 4 is a tabulated view for illustrating the topology information stored in a topology memory of a controller according to the exemplary embodiment 1 of the present disclosure.

FIG. 5 is a tabulated view for illustrating the flow table information stored in a flow entry memory of the controller according to the exemplary embodiment 1 of the present disclosure.

FIG. 6 is a tabulated view for illustrating the flow entry information stored in a flow entry memory of the controller according to the exemplary embodiment 1 of the present disclosure.

FIG. 7 is a tabulated view for illustrating the statistics information stored in a flow statistics memory of the controller according to the exemplary embodiment 1 of the present disclosure.

FIG. 8 is a flowchart showing the operation (flow entry setting) of the communication system according to the exemplary embodiment 1 of the present disclosure.

FIG. 11 is a tabulated view for illustrating the statistics information stored in a flow characteristic setting memory of a controller according to the exemplary embodiment 2 of the present disclosure.

PREFERRED MODES

Initially, the synopsis of the present invention will be explained with reference to the drawings. It is noted that symbols used in the synopsis for reference to the drawings are simply illustrations to assist in understanding and are not intended to limit the present disclosure to the modes illustrated.

Figure 1:
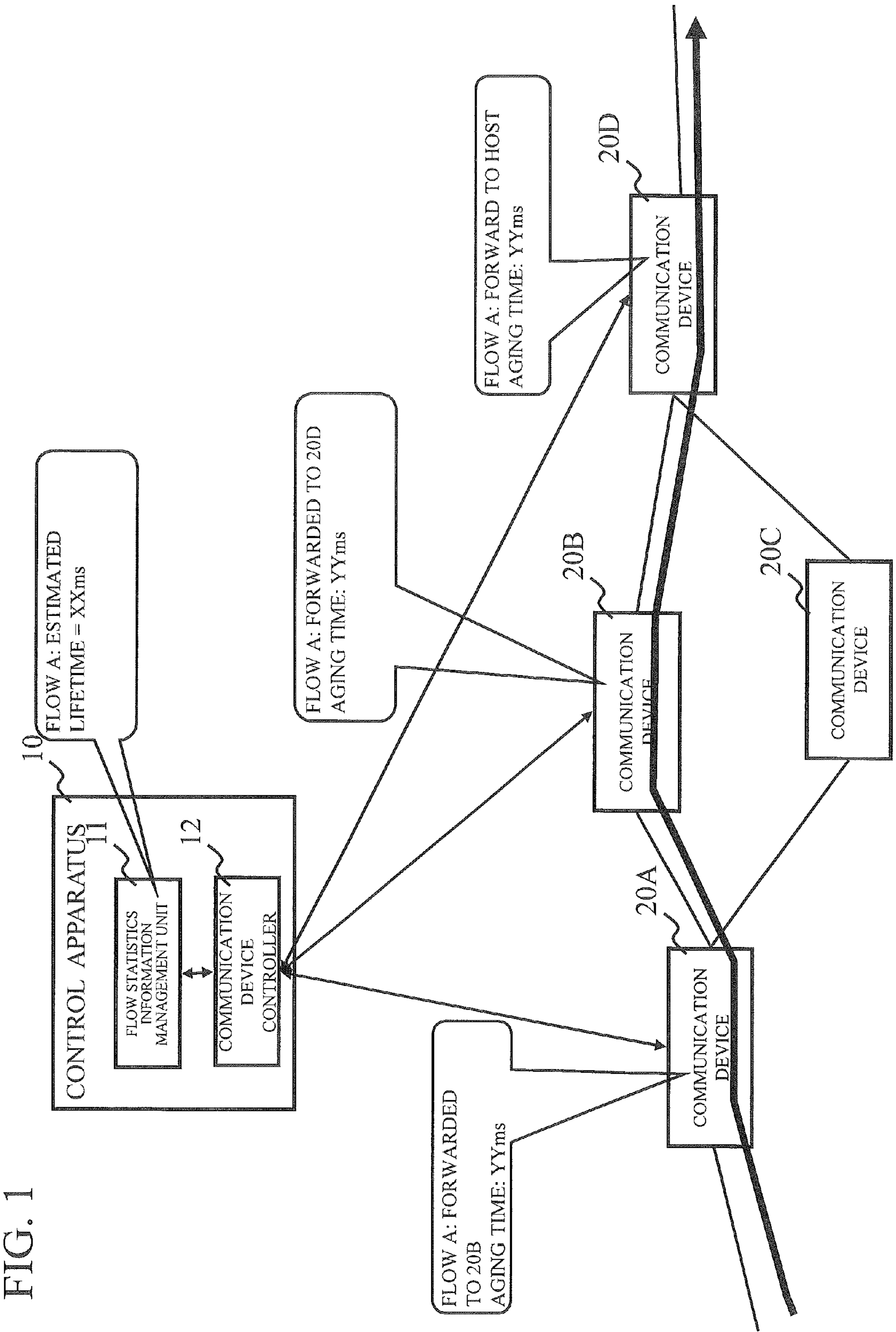
FIG. 1 is a schematic view for illustrating the synopsis of an exemplary embodiment of the present disclosure.

Referring to FIG. 1, an exemplary embodiment of the present disclosure may be implemented by a control apparatus 10 controlling a plurality of communication devices 20A to 20D. More specifically, the control apparatus includes a communication device controller 12 that acts on the flow entries retained by the communication devices 20A to 20D to control a group of the communication devices, and a flow statistics information management unit 11. The flow statistics information management unit gathers and manages the flow statistics information collected by the communication devices 20A to 20D per flow entry. When a new flow is encountered, the communication device controller 12 finds an estimated lifetime of the new flow, such as XXms, based on the flow statistics information, while setting, on a communication device(s) on the path of the new flow, a flow entry in which an aging time consistent with the estimated lifetime has been set. This aging time, which is the 'Idle Timeout value' of the Non-Patent Document 2, may, for example, be YYms. By so setting the flow entry, if no relevant packet is received for longer than YYms as from the time of the setting, the flow entry is removed by aging processing.

By setting not the aging time, decided on the communication system scale, but the aging time consistent with the estimated lifetime of the new flow, the flow entry highly likely to be statistically unnecessary can be removed at an earlier time. On the other hand, the flow entry, highly likely to be statistically necessary, may be retained for longer time.

This suppresses the occurrence of the flow table overflow phenomenon in the communication devices 20A to 20D. In addition, the frequency of occurrence of the flow entry setting requests may be reduced.

It is also possible for the communication device controller 12 to set a flow entry provided with aging time as account is taken not only of the estimated lifetime of the flow but also of whether or not the new flow in question is such flow that occurs periodically. For example, the flow of SNMP (Simple Network Management Protocol) polling from a network management server to a router on the network is featured by the fact that it occurs frequently but has a shorter lifetime. The time interval between occurrences of successive flows depends on the setting in the network management server and differs from one network environment to another. There may possibly be many other flows having similar characteristics, such as KeepAlive communication between applications. If a shorter aging time is set for the flows generated at a shorter time interval or duration, the result is the excessively increased number of times of flow entry registration requests to the controller. Thus, for these flows, it is desirable to set the aging time so as to be at least longer than the time interval between occurrences of successive flows.

The communication device controller 12 may take into account a flow table use ratio (or an empty flow table ratio) of each switch on the flow path to decide the aging time. For example, a shorter aging time value can be set for a communication device having a higher flow table use ratio (or a lower empty flow table ratio). By so doing, the flow entry may be removed only after a shorter time to lower the flow table use ratio. Conversely, a longer aging time value can be set for a communication device having a lower flow table use ratio (or a higher empty flow table ratio). In this manner, the flow entry may be retained for longer time to suppress the flow entry setting requests, viz., to reduce the load on the control apparatus.

Such correction of the aging time in the increasing or decreasing direction in response to the flow table use ratio (or the empty flow table ratio) may be implemented by adding a correction term that makes use of the flow table use ratio or the empty flow table ratio or by using the flow table use or empty ratio as a correction coefficient.

It is also desirable that the same value is set as the aging time value for the total of the communication devices on the path of a given flow, as shown in FIG. 1. By so doing, the flow entries may be removed on the total of the switches on the path simultaneously.

EXEMPLARY EMBODIMENT 1

Figure 2:
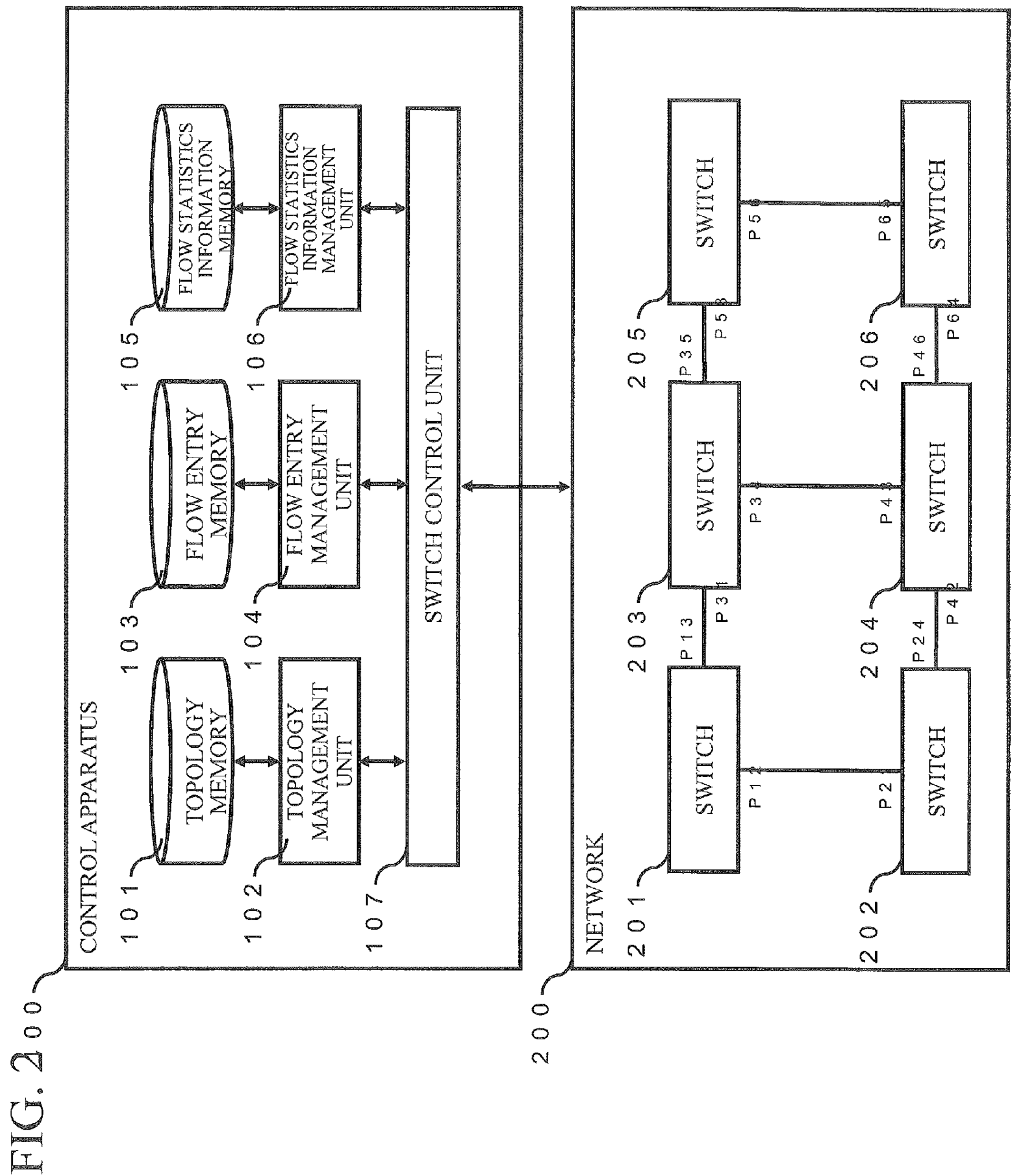
FIG. 2 is a block diagram showing a configuration of a communication system according to an exemplary embodiment 1 of the present disclosure.

An exemplary embodiment 1 of the present disclosure will now be detailed with reference to the drawings. FIG. 2 depicts a block diagram showing a configuration of a communication system according to the exemplary embodiment 1 of the present disclosure. Referring to FIG. 2, the exemplary embodiment 1 of the present disclosure includes a controller 100, equivalent to the above mentioned control apparatus and configured for controlling the switches on a network 200, and the network 200 in which a group of switches 201 to 206, as species of the above mentioned communication device, are arrayed. The controller is equivalent to the above mentioned control apparatus and configured for controlling the switches on the network.

The controller 100 is responsive to the new flow reception notification (Packet-In) from the switches 201 to 206 to register flow entries therein. The switches 201 to 206 forward a received packet in accordance with a flow entry registered in each of the switches.

The network 200 includes the switches 201 to 206, which are interconnected in order for forwarding data. The controller 100 and the switches 201 to 206 are interconnected for control. Each of the switches 201 to 206 may be an OpenFlow switch specified in Non-Patent Documents 1, 2.

Figure 3:
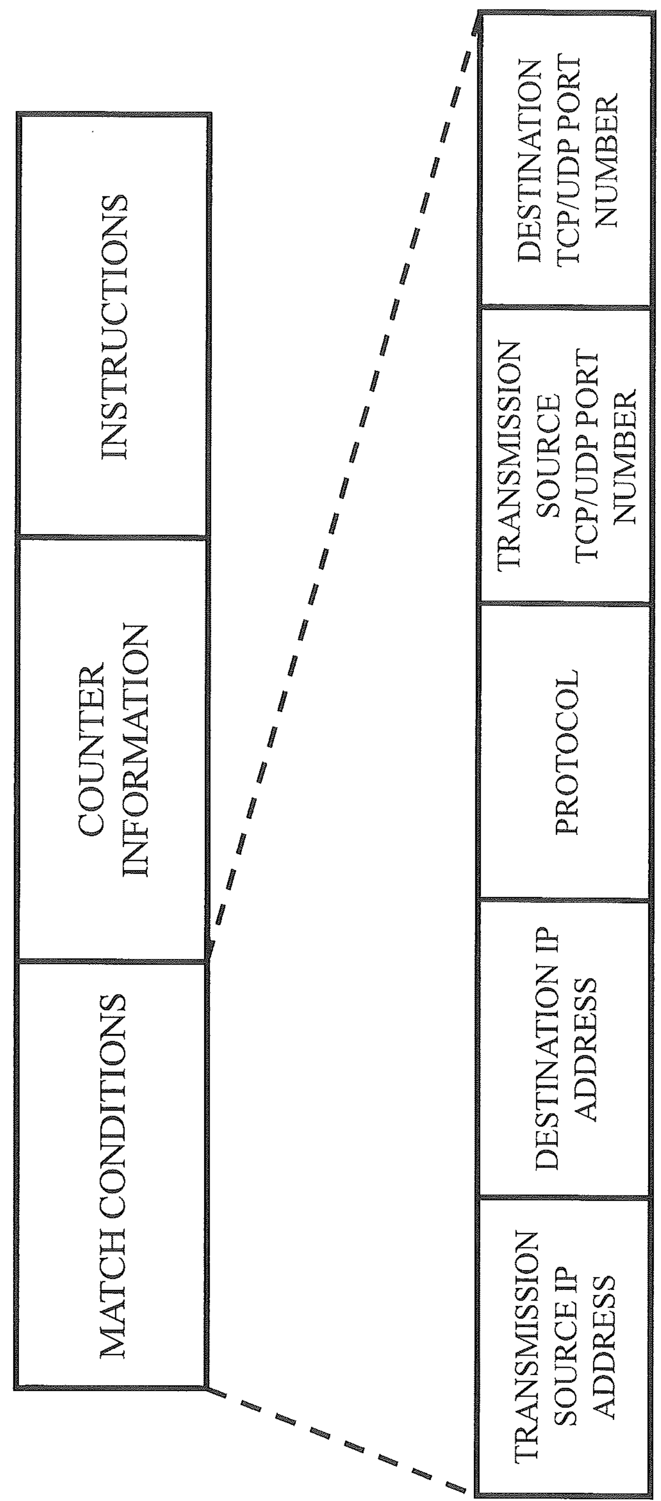
FIG. 3 is a schematic view showing a configuration of a flow entry to be set in a switch of the exemplary embodiment 1 of the present disclosure.

The flow entries include match conditions for flows, the counter information for matched flows (traffic volume) and instructions, as shown in FIG. 3. As the flow match conditions, the following packet header information may be specifically designated. For example, a flow may be specified using, for example, a transmission source IP address, a destination IP address, a protocol, a transmission source TCP/UDP port number or a destination TCP/UDP port number. As the counter information, the number of packets that matched the match conditions and the number of bytes, that is, the traffic volume, are recorded. As the instructions, the processing contents applied to the packets that matched the matching conditions, for example, packet forwarding from the specified port or header rewriting, are specified. These flow entries are stored in the flow tables of the switches 201 to 206.

The controller 100 includes a topology memory 101, a topology management unit 102, a flow entry memory 103, a flow entry management unit 104, a flow statistics information memory 105, a flow statistics information management unit 106 and a switch control unit 107. Such controller 100 may be implemented by adding the functions, which will hereinafter be explained, to the OpenFlow controller, shown in the Non-Patent Documents 1, 2, as a basic structure.

The respective parts of the controller 100 operate substantially as follows: The topology memory 101 has stored the connection states of the switches 201 to 206 on the network 200. The connection states of the network may be represented by sets of the names of the ports and the switches connected to both ends of the links, and link bandwidths, as shown for example in FIG. 4.

The topology management unit 102 collects the connection information of the switches 201 to 206, by means such as LLDP (Link Layer Discovery Protocol), and causes it to be stored in the topology memory 101.

The flow entry memory 103 has stored, for each switch, the number of flow tables registered (number of registered entries), an upper limit of the flow tables registered (the maximum number of registrable entries) and the flow table use ratio (number of registered entries/maximum number of registrable entries), as shown in FIG. 5. The flow entry memory 103 also has stored the registered flow table entries in the switches 201 to 206, as shown in FIG. 6. Although the flow table use ratio is used in the example of FIG. 5, the empty flow table ratio (number of empty entries/the number of maximum registrable entries) may also be used.

The flow entry management unit 104 is responsive to a request from the switch control unit 107 to update the information of the flow entry memory 103. If, on receipt of a new flow reception notification, the flow entry management unit has registered a corresponding flow entry in each of the switches 201 to 206, the flow entry management unit increments the number of registered flow tables for the relevant switch(es) of the table of FIG. 5. Also, the flow entry management unit re-calculates the flow table use ratio, while adding the flow entry to the table of FIG. 6. On receipt of a notification for flow table removal due to aging from the switches 201 to 206, the flow entry management unit 104 decrements the number of the flow table(s) registered for the relevant switches in the table of FIG. 5 to re-calculate the flow table use ratio, while removing the flow entry at the same time from the table of FIG. 6.

To verify the flow characteristic, the flow statistics information memory 105 has stored the statistics information on the flow basis. The flow statistics information has stored, from one flow to another, the flow information (from "transmission source IP address" to "destination TCP/UDP port number"), an average flow table registration time interval, an average aging time value, and an average count number per aging, as shown in FIG. 7.

The flow statistics information management unit 106 is responsive to a request from the switch control unit 107 to update the information of the flow statistics information memory 105. If, on receipt of the new flow reception notification, the flow statistics information management unit 106 has registered the flow tables in the switches 201 to 206, the flow statistics information management unit re-calculates the number of times of flow table registration per apparatus time in the relevant entries of the flow statistics information, and updates the average flow table registration time interval. Moreover, the flow statistics information management unit 106 re-calculates the average aging time from the as-set value of the aging time and updates it. It is noted that, in re-calculating the number of times of flow table registration and the aging time values, such a method which uses an exponential smoothing method to put weight on the nearest value may be used. If notified from the switches 201 to 206 about the removal of the flow entry due to aging, the flow statistics information management unit 106 re-calculates the average count value from the counter information of the so removed flow entry. In re-calculating the count value, such a method which uses an exponential smoothing method to put weight on the nearest value may be used.

On receipt of the new flow reception from the switches 201 to 206, the switch control unit 107 determines the flow path based on the information concerning the network connection states in the topology memory 101 and the information concerning the flow table use ratio in the flow entry memory 103. As for details of the path determining method, reference may be made to a method stated in Patent Document 3.

The switch control unit 107 also determines the aging time value of the flow based on the maximum value of the flow table use ratio of the switches on the path, as found from the information in the flow entry memory 103, and on the information on the average flow table registration time interval, the average aging time value and the average count value in the flow statistics information memory 105. From the above information, the switch control unit generates a flow entry and requests each switch on the path to register the flow entry that has set therein the above mentioned aging time. After completion of the registration, the switch control unit 107 requests the flow entry management unit 104 and the flow statistics information management unit 106 to update the information.

On receipt of a flow table removal notification from the switches 201 to 206, the switch control unit 107 requests the flow statistics information management unit 106 to update the information, specifically, to update the average count number. The switch control unit 107 also makes an update request to the flow entry management unit 104, specifically, a request to update the number of the registered flow tables and the flow table use ratio in the flow table memory 103. The switch control unit also requests removing the relevant flow table entry.

The switches 201 to 206 forward the packet received, or otherwise, in accordance with the flow entries registered therein. If there is no flow entry having match conditions matched to the received packet, the switches 201 to 206 transmit a new flow reception notification to the controller 100, and forward the flow or otherwise in accordance with the instructions from the controller 100. If once the flow entry has been registered from the controller 100 in response to the new flow reception notification, the ensuing packets of the same flow are forwarded in accordance with the flow entries registered in the switches 201 to 206, as the counter information of the flow entries is sequentially incremented. The aging time value is set in each flow entry, such that, if the state of non-communication persists for the so set time duration, the switches 201 to 206 remove the relevant flow entries. If the flow entries have been removed due to aging, the switches 201 to 206 notify the controller 100 of the removal and about the counter information for the so removed flow entries.

It is noted that the respective parts (processing means) of the controller 100, shown in FIG. 1, may also be implemented by a computer program which causes a computer constituting the controller 100 to execute the above mentioned respective processing operations with the use of the computer's hardware.

The operation of the exemplary embodiment 1 of the present disclosure will now be detailed with reference to the flowcharts shown in FIG. 8, 9. Initially, a sequence of operations to be performed on occurrence of a new flow will be explained with reference to the flow chart of FIG. 8. In the following explanation, it is assumed that the switch 201 has received a new packet.

On receipt of the packet (step A-1), the switch 201 searches, from its flow table, the flow entry having match conditions matched to the received packet (step A2).

If the flow entry having the match conditions matched to the received packet has been found (Yes of the step A2), the switch 201 processes the received packet in accordance with the contents of the instruction field of the flow table, and increments the counter information of the flow table. The switch then returns to the initial state (step A3).

If conversely the flow entry matched to the received packet has not been found (No of the step A2), the switch 201 transmits a packet reception notification (new flow reception notification) to the controller 100 (step A4).

On receipt of the packet reception notification, the switch control unit 107 of the controller 100 decides on the path of the packet received by the switch 201 based on the information concerning the network connection states in the topology memory 101 and on the flow table use ratio in the flow entry memory 103. As for details of the path determining method, reference may be made to a method stated in Patent Document 3. Here, it is assumed that a path from the switch 201 to the switch 203, thence to the switch 205 and thence to the switch 206, for example, has been selected (step A5).

The switch control unit 107 determines the aging time value of the flow, based on the information concerning the maximum value of the flow table use ratio in the switches on the path, as found from the flow entry memory 103, and on the information concerning an average flow table registration time interval, an average aging time value and an average count number in the flow statistics information memory 105 (step A6). The average aging time value of the relevant flow may, for example, be directly used as the aging time value.

The aging time value may also be set in the following manner as necessary. If the maximum value of the flow table use ratio of a given switch on the path exceeds a preset threshold value, that is, there is not much allowance in the empty state for the flow tables in any of the switches on the path, a preset minimum aging time value may be set for the flow whose average count number is less than a preset average count number. As for other flows (flows whose average count numbers are not less than the count number), the aging time value may be found by a preset calculation formula: an average aging time value×(1−maximum value of the flow table use ratio on the path)×a preset coefficient. For example, if, in the state of FIG. 4 to FIG. 6, the upper threshold value is 75% and the coefficient is 2, the aging time value may be found by $300\times(1-0.8)\times2=120$ sec. In this manner, an aging time is set, which is lesser by 180 seconds than if the average aging time is directly set.

If, on the other hand, the maximum value of the flow table use ratio in the switch(es) on the path is less than the lower threshold value, that is, there is a flow table allowance in the total of the switches on the path, the average flow table registration time interval may directly be used as the aging time value for flows whose average flow table registration time interval is within a preset range. For other flows (flows in each of which the average flow table registration time interval is not less than a preset upper threshold value), the aging time value may be found by a formula: average aging time value×(1−maximum value of the flow table use ratio on the path)×a preset coefficient.

The switch control unit 107 generates a flow entry in which the aging time calculated as above has been set, and requests each of the switches 201, 203, 205 and 206 on the path to register the flow entry (step A7).

On completion of the registration, the switch control unit 107 requests the switch 201 to transmit the received packet at its port of connection to the switch 203 (Packet-Out message of Non-Patent Document 2). The received packet is then forwarded from the switch 203 to the switch 205 and thence to the switch 206 in accordance with the flow entries of the switches on the path. The switch control unit 107 also requests the flow entry management unit 104 and the flow statistics information management unit 106 to update the information (step A8).

The flow entry management unit 104 is responsive to the request from the switch control unit 107 to update the information in the flow entry memory 103. The flow entry management unit increments the number of the registered flow tables in the switches 201, 203, 205 and 206 and re-calculates the flow table use ratio, while adding the flow entry to the table of FIG. 6 (step A9).

The flow statistics information management unit 106 is responsive to a request from the switch control unit 107 to update the information in the flow statistics information memory 105. The flow statistics information management unit re-calculates the average flow table registration time interval of the relevant entry of the flow statistics information, while re-calculating the average aging time value from the so set aging time. In re-calculating the flow table registration time interval and the aging time value, such a method which uses an exponential smoothing method to put weight on the nearest value may be used (step A10).

Reversion is then made to the initial state. If a new packet is received, processing is continued in accordance with a similar sequence of operations.

Figure 9:
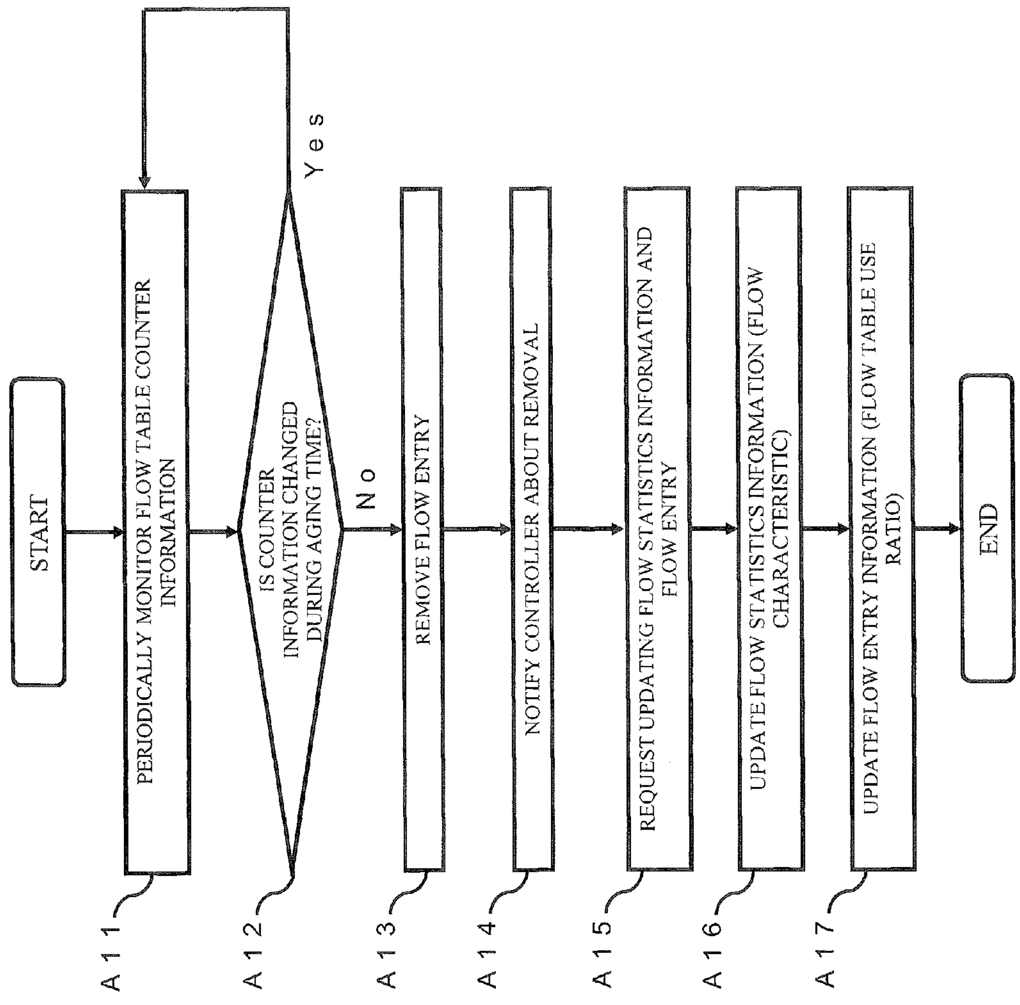
FIG. 9 is a flowchart showing the operation (aging processing) of the communication system according to the exemplary embodiment 1 of the present disclosure.

The flow entry aging processing will now be explained with reference to the flowchart of FIG. 9. Here, the aging processing for the flow entry for the switch 201 will be explained, as an example, with the aging time value of the flow entry of interest being 300 sec.

The switch 201 periodically monitors the counter information of the flow entry registered in the flow table (step A11).

The switch 201 checks whether or not the counter value has changed within the aging time value of the flow entry, which is here 300 sec (step A12). If the counter information of the flow entry has changed within the time specified by the aging time value (Yes of the step A12), the switch returns to the step A11 to continue the monitoring.

If the counter information of the flow entry has not changed within the time specified by the aging time value (No of the step A12), the switch 201 removes the flow entry (step A13).

The switch 201 delivers the counter information of the removed flow entry to the controller 100, while also notifying the controller 100 of the fact of removal of the flow entry (step A14).

On receipt of the notification of flow entry removal from the switch 201, the switch control unit 107 of the controller 100 requests the flow statistics information management unit 106 and the flow entry management unit 104 to update the information (step A15).

The flow statistics information management unit 106 is responsive to the request from the switch control unit 107 to update the information of the flow statistics information memory 105, and re-calculates the average count number from the counter information notified. In re-calculating the count number, such a method which uses an exponential smoothing method to put weight on the nearest value may be used (step A16).

The flow entry management unit 104 is responsive to the request from the switch control unit 107 to update the information of the flow entry memory 103. The flow entry management unit decrements the number of the registered flow tables in the switch 201, which has made the removal notification, re-calculates the flow table use ratio and removes the relevant flow entry from the table of FIG. 6 (step A17).

Reversion is then made to the initial state and the aging processing for the flow table is carried out by the same sequence of operations.

As set out above, deterioration of the packet forwarding performance may be suppressed even in a network environment coping with larger numbers of flows. The reason is that, by setting the aging time that takes account of flow characteristic, it is possible to suppress flow table overflow in the switches.

Moreover, according to the present exemplary embodiment, deterioration of the packet forwarding performance may be suppressed even in a case that a switch(es) that may become a deterrent from the viewpoint of flow table capacity exists on the path. The reason is that, by setting the aging time value which takes account of the flow table use ratio in the switches on the path, and which is shorter than the usual aging time value, it is possible to suppress flow table overflow in the respective switches.

Additionally, according to the present exemplary embodiment, the load on the controller may be suppressed in connection with a flow sent on a path having a flow table capacity allowance. For example, by setting the aging time value which takes account of the flow table use ratio in the switches on the path, that is, the aging time value longer than the usual value, the flow entry may be retained in each switch. By so doing, the number of times of requests for flow entry setting may be reduced to decrease the overhead.

EXEMPLARY EMBODIMENT 2

Figure 10:
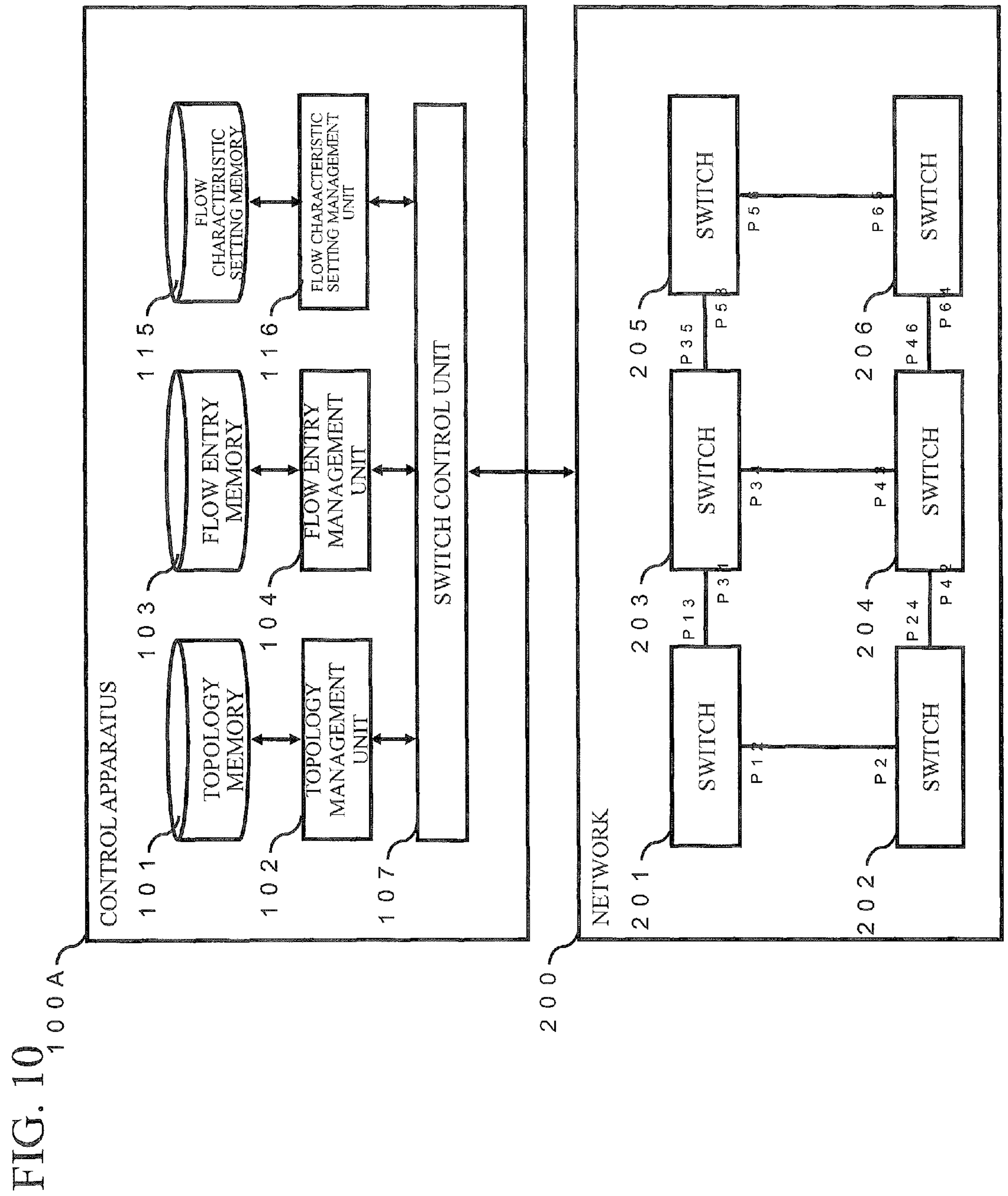
FIG. 10 is a block diagram showing a configuration of a communication system according to an exemplary embodiment 2 of the present disclosure.

An exemplary embodiment 2 of the present disclosure, in which the aging time is set using not the flow statistics information but certain parameters specified from a network administrator, will now be detailed with reference to the drawings. FIG. 10 depicts a block diagram showing a configuration of a communication system according to the exemplary embodiment 2 of the present disclosure. FIG. 10 depicts a block diagram showing a configuration of a communication system according to the exemplary embodiment 2 of the present disclosure. The following explanation is centered about the points of difference from the exemplary embodiment 1.

Referring to FIG. 10, the configuration of the exemplary embodiment 2 of the present disclosure includes, in the controller 100A, a flow characteristic setting memory 115 and a flow characteristic setting management unit 116, in place of the flow statistics information memory 105 and the flow statistics information management unit 106 of the controller 100 of the exemplary embodiment 1.

The flow characteristic setting memory 115 has stored flow-based setting information (flow characteristic setting information) as set by the administrator. In this flow characteristic setting information, the flow occurrence time interval and the reference aging time value are set, from one flow specified by the flow information to another, as shown for example in FIG. 11.

The flow characteristic setting management unit 116 is responsive to a request from the administrator to set, change or remove the information in the flow characteristic setting memory 115.

Figure 12:
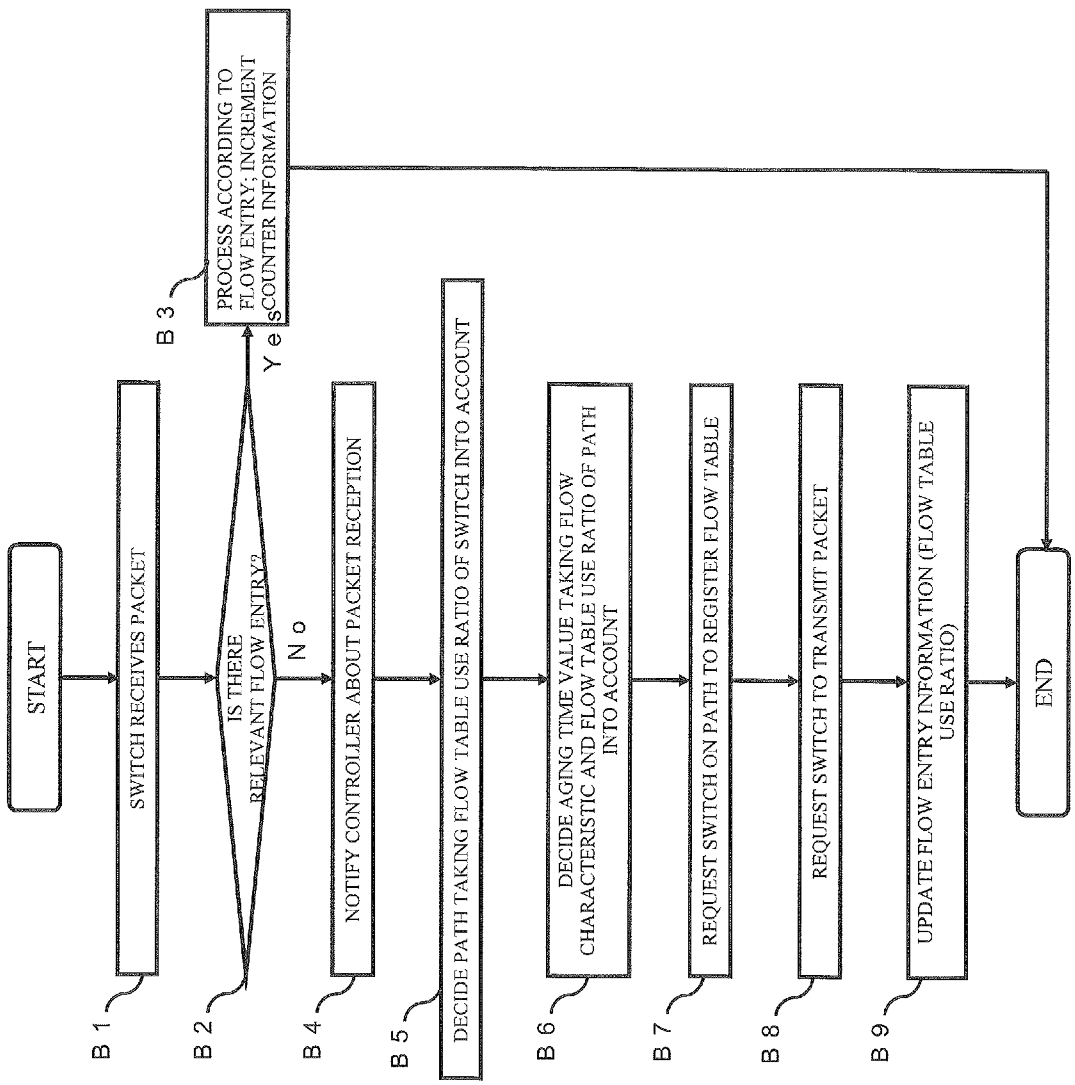
FIG. 12 is a flowchart showing the operation (flow entry setting) of the communication system according to the exemplary embodiment 2 of the present disclosure.
Figure 13:
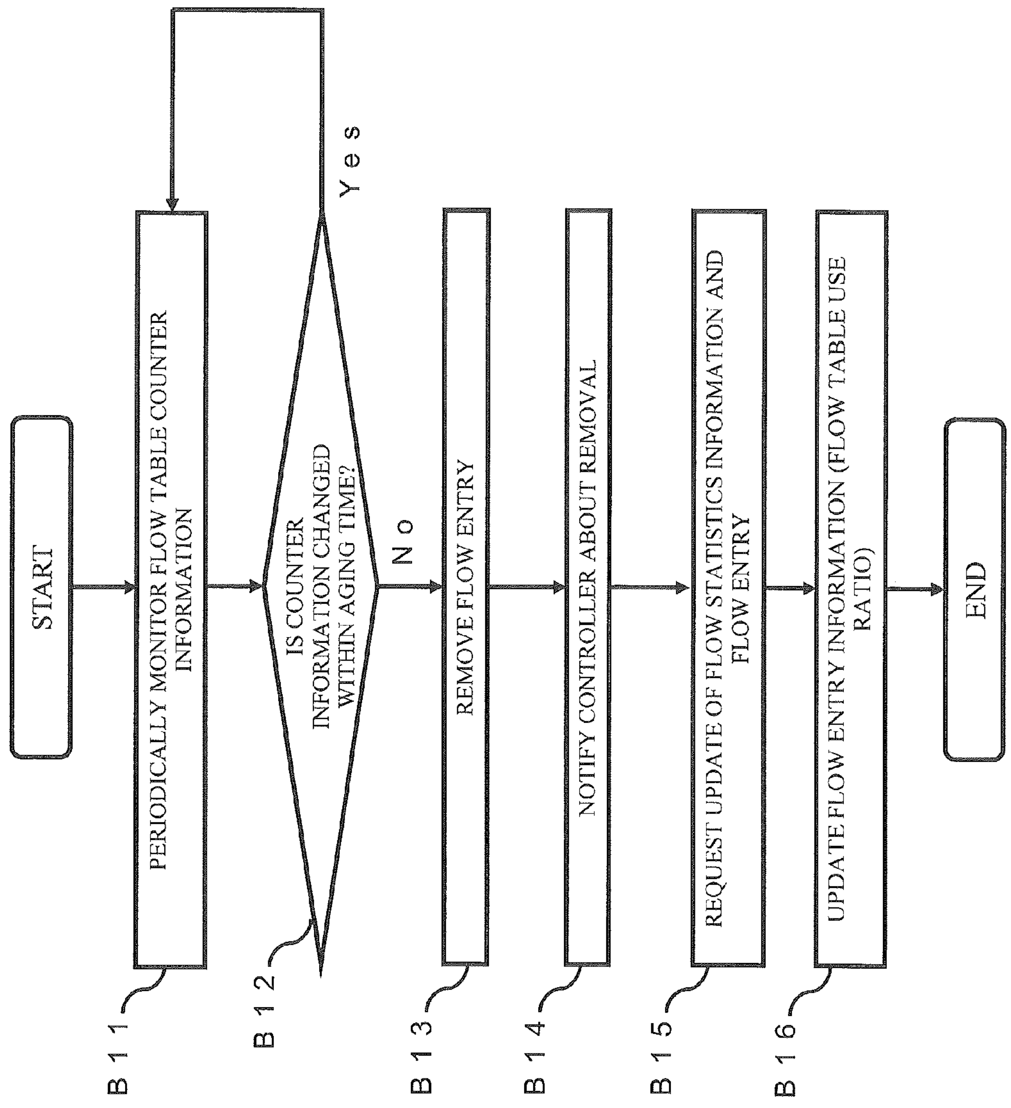
FIG. 13 is a flowchart showing the operation (aging processing) of the communication system according to the exemplary embodiment 2 of the present disclosure.

The operation of the exemplary embodiment 2 of the present disclosure n will now be detailed with reference to flowcharts of FIG. 12 and FIG. 13.

Initially, the operation in receiving a packet will be explained with reference to the flowchart of FIG. 12. In the following, it is assumed that the switch 201 has received a new packet.

On receipt of a packet (step B1), the switch 201 searches, from the flow table, a flow entry having match conditions matched to the received packet (step B2).

If a flow entry having the match conditions matched to the received packet is found (Yes of the step B2), the switch 201 processes the received packet in accordance with the contents of the instruction field of the flow table. After incrementing the counter information of the flow table, the switch 201 reverts to its initial state (step B3).

If conversely the flow entry having match conditions matched to the received packet has not been found (No of the step B2), the switch 201 transmits a packet reception notification (new flow reception notification) to the controller 100 (step B4).

On reception of the packet reception notification, the switch control unit 107 of the controller 100 determines the path of the packet, received by the switch 201, based on the information concerning the network connection states in the topology memory 101 and the information concerning the flow table use ratio in the flow entry memory 103. The method for determining the path, discussed in detail in Patent Document 3, may be used in determining the path, as an example. It is here assumed that a path from the switch 201 to the switch 203, thence to the switch 205 and thence to the switch 206 has been selected (step B5).

Furthermore the switch control unit 107 determines the aging time value of the flow based on the information concerning the maximum value of the flow table use ratio of the switches on the path, as found from the flow entry memory 103, and on the flow occurrence time interval as well as the reference aging time value in the flow characteristic setting memory 115 (step B6). For example, the reference aging time value for the relevant flow may directly be used as the aging time value.

The following aging time value may also be set as necessary. In a case that the maximum value of the flow table use ratio of a given switch on the path exceeds a predetermined threshold value, that is, there is no sufficient allowance in the empty state for the flow table in a given switch on the path, the aging time value can be found by a predetermined calculation formula such as reference aging time value×(1−maximum value of the flow table use ratio on the path)×a preset coefficient. For example, if, in the state of FIG. 4 or FIG. 9, the upper threshold value is 75% and the coefficient is 2, the aging time value may be calculated by 300×(1−0.8)×2=120 sec.

If, on the other hand, the maximum value of the flow table use ratio of the switches on the path is not greater than the lower limit value, that is, there is flow table allowance in the total of the switches on the path, the flow occurrence time interval in the flow characteristic setting memory 115 may directly be set as the aging time value.

The switch control unit 107 generates a flow entry, in which the aging time calculated as described above has been set, and requests the switches 201, 203, 205 and 206 on the path to register the flow entry (step B7).

If the registration has been finished, the switch control unit 107 requests the switch 201 to transmit the received packet to a connection port to the switch 203 (Packet-Out message in Non-Patent Document 2). Subsequently, the packet is forwarded to the switch 203, thence to the switch 205 and thence to the switch 206 in accordance with the flow entries in the switches on the path. The switch control unit 107 also requests the flow entry management unit 104 to update the information (step B8).

The flow entry management unit 104 is responsive to a request from the switch control unit 107 to update the information in the flow entry memory 103. The flow entry management unit increments the number of the flow table registrations in each of the switches 201, 203, 205 and 206 of FIG. 5 and re-calculates the flow table use ratio, while adding the flow entry to the table of FIG. 6 (step B9).

Then, reversion is made to the initial state. If a new packet is received, processing is performed by the same sequence of operations.

Next, processing for flow entry aging will be explained with reference to the flowchart of FIG. 13. Here, the processing for aging for the switch 201 will be explained, as an example, with the aging time value of a flow entry of interest being 30 sec.

The switch 201 periodically monitors the counter information of the flow entries registered in the flow table (step B11).

The switch 201 checks to see whether or not the counter information has changed within an aging time value of the flow entry, here 300 sec (step B12). If the counter information of the flow entry has changed within the time specified by the aging time value (Yes of the step B12), processing reverts to the step B11 to continue the monitoring.

If the flow entry counter information has not changed during the time specified by the aging time value (No of the step B12), the switch 201 removes the flow entry in question (step B13).

The switch 201 informs the controller 100 about the fact of flow entry removal (step B14).

On receipt of the flow entry removal notification from the switch 201, the switch control unit 107 of the controller 100 requests the flow entry management unit 104 to update the information (step B15).

The flow entry management unit 104 is responsive to the request from the switch control unit 107 to update the information in the flow entry memory 103. The flow entry management unit decrements the number of the registered flow tables in the switch 201 that made the removal notification, and re-calculates its flow table use ratio, while removing the relevant flow entry from the table of FIG. 6 (step B16).

Reversion is then made to the initial state and the flow table aging processing is carried out by the same sequence of operations.

According to the present exemplary embodiment, described above, deterioration in the packet forwarding performance may be suppressed, as in the exemplary embodiment 1, without collecting the statistics information from the switches on the network.

Although preferred exemplary embodiments of the present disclosure have been described in the foregoing, the present disclosure is not limited to the particular exemplary embodiments, and a variety of changes, substitutions or adjustments may be made without departing from the fundamental technical scope of the disclosure. For example, fine-textured control may be implemented by combining the above described exemplary embodiments 1 and 2 together in order to combine the flow statistics information and the parameters set by the network administrator together.

Certain preferred modes of the present disclosure will now be summarized.

[Mode 1]

(See the control apparatus according to the above mentioned first aspect)

[Mode 2]

The control apparatus according to mode 1, wherein, the communication device controller sets, as the aging time of the flow entry to be set on the communication devices on the path of the new flow, the same value for each of the communication devices on the path.

[Mode 3]

The control apparatus according to mode 2, further comprising a flow entry management unit that manages the flow entry retained by each communication device;

the communication device controller finding the flow table use ratio or the empty flow table ratio from the number of flow entries registered or the number of empty entries in the flow table over the maximum number of registrable flow entries in each communication device;

the communication device controller correcting the aging time of the flow entry to be set on the communication devices on the path of the new flow based on an average value of the flow table use ratio or the empty flow table ratio of the communication devices on the path of the new flow.

[Mode 4]

The control apparatus according to mode 3, wherein, in a case that the average value of the flow table use ratio is higher than a preset reference value or the empty flow table ratio is lower than a preset reference value, the aging time of the flow entry to be set on the communication device on the path of the new flow is corrected in a decreasing direction.

[Mode 5]

The control apparatus according to mode 3 or 4, wherein, in a case that the average value of the flow table use ratio is lower than the preset reference value or the empty flow table ratio is higher than the preset reference value, the aging time of the flow entry to be set on the communication device on the path of the new flow is corrected in an increasing direction.

[Mode 6]

The control apparatus according to any one of modes 1 to 5, wherein, as the estimated lifetime, an average aging time of the same flows during a past preset time duration, as found from the flow statistics information, is used.

[Mode 7]

The control apparatus according to any one of modes 1 to 6, wherein, the flow statistics information contains the occurrence time interval of the same flows during the past preset time period;

the communication device controller in case the occurrence time interval of the same flows is shorter than a preset threshold value setting the occurrence time interval of the same flows as the aging time.

[Mode 8]

The control apparatus according to any one of modes 1 to 7, wherein, the flow statistics information includes an average value of the traffic volumes of the same flows during a reset past time period;

the communication device controller setting a preset minimum aging time in a case that the average value of the traffic volumes of the same flows is less than a preset value.

[Mode 9]

The control apparatus according to mode 1, comprising, in place of the flow statistics information management unit, a flow characteristic setting memory that stores the flow characteristic setting information as set by a network administrator;

the communication device controller on occurrence of a new flow setting a flow entry that has set reference aging time contained in the flow characteristic setting information in the communication device on the path of the new flow.

[Mode 10]

The control apparatus according to mode 9, wherein, the communication device controller sets, as the aging time of the flow entry to be set on the communication device on the path of the new flow, the same value on each of the communication devices on the path.

[Mode 11]

The control apparatus according to mode 10, further comprising a flow entry management unit that manages flow entries retained in each communication device;

the communication device controller finding a flow table use ratio or an empty flow table ratio from the number of registered flow entries or the number of empty flow tables over the maximum number of registrable flow entries in each communication device;

the communication device controller correcting the aging time of the flow entry to be set on the communication devices on the path of the new flow based on an average value of the flow table use ratio or the empty flow table ratio of the communication devices on the path of the new flow.

[Mode 12]

The control apparatus according to mode 11, wherein, in a case that an average value of the flow table use ratio is higher than a preset reference value or the empty flow table ratio is lower than a preset reference value, the aging time of the flow entry to be set on the communication device on the path of the new flow is corrected in a decreasing direction.

[Mode 13]

The control apparatus according to any one of modes 9 to 12, wherein, the flow characteristic setting information includes the flow occurrence time interval as set from a network administrator;

the communication device controller setting the flow occurrence time interval as the aging time in a case that the average value of the flow table use ratio is lower than the preset reference value.

[Mode 14]

(See the communication system according to the above mentioned second aspect)

[Mode 15]

(See the communication method according to the above mentioned third aspect)

[Mode 16]

(See the program according to the above mentioned fourth aspect) Like the mode 1, each of the above mentioned modes 14 to 16 may be extended into modes 2 to 13.

The disclosures of the above mentioned Patent Documents and the Non-Patent Documents are incorporated herein by reference. The particular exemplary embodiments or examples may be changed or adjusted within the gamut of the entire disclosure of the present invention, inclusive of exemplary embodiments and modes, based on the fundamental technical concept of the invention. Moreover, a variety of combinations or selection of elements herein disclosed (elements of Exemplary Embodiments, Examples and drawings) may be made within the concept of the modes of the present invention. Viz., the present invention may include a variety of changes or corrections that may occur to those skilled in the art in accordance with the total disclosures inclusive of the modes and the drawings as well as the technical concept of the invention. In particular, as regards the ranges of numerical values set out herein, any optional numerical figures or sub-ranges contained in the ranges should be regarded as if they have in fact been specifically stated even in the absence of explicit statements.

EXPLANATION OF NUMERALS

10 control apparatus
11 flow statistics information management unit
12 communication device controller
20A to 20D communication devices
100, 100A controllers
201 to 206 group of switches
200 network
101 topology memory
102 topology management unit
103 flow entry memory
104 flow entry management unit
105 flow statistics information memory
106 flow statistics information management unit
107 switch control unit
115 flow characteristic setting memory
116 flow characteristic setting management unit

What is claimed is:

1. A control apparatus, comprising:

a communication device controller that acts on a set of flow entries retained by a group of communication devices to control the group of the communication devices; and a processor coupled to a memory storing instructions for executing a flow statistics information management unit that is configured to gather and to manage flow statistics information collected by a communication device of the communication devices per flow entry, wherein the communication device controller on occurrence of a new flow finds an estimated lifetime of the new flow based on the flow statistics information, and sets a flow entry, having set an aging time consistent with the estimated lifetime, on the communication devices on a path of the new flow, wherein the set flow entry is removed from the communication devices if no packet corresponding to the set flow entry is received for longer than the set aging time, wherein the communication device controller sets, as the aging time of the flow entry to be set on the communication devices on the path of the new flow, the aging time of a same value for each of the communication devices on the path, and wherein the processor causes the instructions to execute a flow entry management unit that is configured to manage the flow entry retained by each communication device, the communication device controller finding a flow table use ratio or an empty flow table ratio from a number of flow entries registered or a number of empty entries in a flow table over a maximum number of registrable flow entries in each communication device, and the communication device controller correcting the aging time of the flow entry to be set on communication devices on the path of the new flow based on an average value of the flow table use ratio or the empty flow table ratio of the communication devices on the path of the new flow.

2. The control apparatus according to claim 1, wherein, in a case that the average value of the flow table use ratio is higher than a preset reference value or the empty flow table ratio is lower than a preset reference value, the aging time of the flow entry to be set on the communication devices on the path of the new flow is corrected in a decreasing direction.

3. The control apparatus according to claim 1, wherein, in a case that the average value of the flow table use ratio is lower than a preset reference value or the empty flow table ratio is higher than the preset reference value, the aging time of the flow entry to be set on the communication devices on the path of the new flow is corrected in an increasing direction.

4. The control apparatus according to claim 1, wherein, as the estimated lifetime, an average aging time of same flows during a past preset time duration, as found from the flow statistics information, is used.

5. The control apparatus according to claim 1, wherein the set aging time represent a threshold value for determining whether or not to remove the set flow entry.

6. A control apparatus, comprising:

a communication device controller that acts on a set of flow entries retained by a group of communication devices to control the group of the communication devices; and a processor coupled to a memory storing instructions for executing a flow statistics information management unit that is configured to gather and to manage flow statistics information collected by a communication device of the communication devices per flow entry, wherein the communication device controller on occurrence of a new flow finds an estimated lifetime of the new flow based on the flow statistics information, and sets a flow entry, having set an aging time consistent with the estimated lifetime, on the communication devices on a path of the new flow, wherein the set flow entry is removed from the communication devices if no packet corresponding to the set flow entry is received for longer than the set aging time, and wherein, as the estimated lifetime, an average aging time of same flows during a past preset time duration, as found from the flow statistics information, is used.

7. A control apparatus, comprising:

a communication device controller that acts on a set of flow entries retained by a group of communication devices to control the group of the communication devices; and a processor coupled to a memory storing instructions for executing a flow statistics information management unit that is configured to gather and to manage flow statistics information collected by a communication device of the communication devices per flow entry, wherein the communication device controller on occurrence of a new flow finds an estimated lifetime of the new flow based on the flow statistics information, and sets a flow entry, having set an aging time consistent with the estimated lifetime, on the communication devices on a path of the new flow, wherein the set flow entry is removed from the communication devices if no packet corresponding to the set flow entry is received for longer than the set aging time, and wherein the flow statistics information contains an occurrence time interval of same flows during a past preset time period, the communication device controller, in case the occurrence time interval of the same flows is shorter than a preset threshold value, setting the occurrence time interval of the same flows as the aging time.

8. A control apparatus, comprising:

a communication device controller that acts on a set of flow entries retained by a group of communication devices to control the group of the communication devices; and a processor coupled to a memory storing instructions for executing a flow statistics information management unit that is configured to gather and to manage flow statistics information collected by a communication device of the communication devices per flow entry, wherein the communication device controller on occurrence of a new flow finds an estimated lifetime of the new flow based on the flow statistics information, and sets a flow entry, having set an aging time consistent with the estimated lifetime, on the communication devices on a path of the new flow, wherein the set flow entry is removed from the communication devices if no packet corresponding to the set flow entry is received for longer than the set aging time, and wherein the flow statistics information includes an average value of traffic volumes of same flows during a preset past time period, the communication device controller setting a preset minimum aging time in a case that the average value of the traffic volumes of the same flows is less than a preset value.

9. A control apparatus, comprising:

a communication device controller that acts on a set of flow entries retained by a group of communication devices to control the group of the communication devices; and a processor coupled to a memory storing instructions for executing a flow statistics information management unit that is configured to gather and to manage flow statistics information collected by a communication device of the communication devices per flow entry, wherein the communication device controller on occurrence of a new flow finds an estimated lifetime of the new flow based on the flow statistics information, and sets a flow entry, having set an aging time consistent with the estimated lifetime, on the communication devices on a path of the new flow, wherein the set flow entry is removed from the communication devices if no packet corresponding to the set flow entry is received for longer than the set aging time, and wherein, in place of the flow statistics information management unit, a flow characteristic setting memory is arranged that stores flow characteristic setting information as set by a network administrator, the communication device controller, on occurrence of a new flow, setting a flow entry that has set reference aging time contained in the flow characteristic setting information on the communication devices on the path of the new flow.

10. The control apparatus according to claim 9, wherein, the communication device controller sets, as the aging time of the flow entry to be set on the communication devices on the path of the new flow, the same value on each of the communication devices on the path.

11. The control apparatus according to claim 10, wherein the processor causes the instructions to execute a flow entry management unit that is configured to manage flow entries retained in the communication devices, the communication device controller finding a flow table use ratio or an empty flow table ratio from a number of registered flow entries or a number of empty flow tables over a maximum number of registrable flow entries in each communication device, and the communication device controller correcting the aging time of the flow entry to be set on the communication devices on the path of the new flow based on an average value of the flow table use ratio or the empty flow table ratio of the communication devices on the path of the new flow.

12. The control apparatus according to claim 11, wherein, in a case that an average value of the flow table use ratio is higher than a preset reference value or the empty flow table ratio is lower than a preset reference value, the aging time of the flow entry to be set on the communication devices on the path of the new flow is corrected in a decreasing direction.

13. The control apparatus according to claim 9, wherein the flow characteristic setting information includes a flow occurrence time interval as set from a network administrator, and the communication device controller setting the flow occurrence time interval as the aging time in a case that the average value of a flow table use ratio is lower than a preset reference value.

14. A communication system, comprising:

the control apparatus according to claim 1; and the communication devices processing a packet using the flow entry as set from the control apparatus.

15. A communication system, comprising:

the control apparatus according to claim 9; and the communication devices processing a packet using the flow entry as set from the control apparatus.

16. A method for controlling a communicating apparatus, the method comprising:

reading out, on occurrence of a new flow, a reference aging time contained in flow characteristic setting information from a flow characteristic setting memory that stores the flow characteristic setting information as set by a network administrator, the communication apparatus comprising a control apparatus including a communication device controller that acts on a set of flow entries retained by a group of communication devices to control the group of the communication devices, and the flow characteristic setting memory; and setting a flow entry that has set the reference aging time on the communication devices on a path of the new flow, wherein the set flow entry is removed from the communication devices if no packet corresponding to the set flow entry is received for longer than the set aging time.

17. A control apparatus, comprising:

a communication device controller that acts on a set of flow entries retained by a group of communication devices to control the group of the communication devices; and a processor coupled to a memory storing instructions for executing a flow statistics information management unit that is configured to gather and to manage flow statistics information collected by a communication device of the communication devices per flow entry, wherein the communication device controller on occurrence of a new flow finds an estimated lifetime of the new flow based on the flow statistics information, and sets a flow entry, having set an aging time consistent with the estimated lifetime, on the communication devices on a path of the new flow, wherein the set flow entry is removed from the communication devices if no packet corresponding to the set flow entry is received for longer than the set aging time, wherein the communication device controller sets, as the aging time of the flow entry to be set on the communication devices on the path of the new flow, the aging time of a same value for each of the communication devices on the path, and wherein, as the estimated lifetime, an average aging time of same flows during a past preset time duration, as found from the flow statistics information, is used.

* * * * *